United States Patent [19]

Bernard

[11] 3,828,442
[45] Aug. 13, 1974

[54] GOLF BALL SPHERICITY GAUGE
[76] Inventor: Henry W. Bernard, 8103 Rt. 53, Woodridge, Ill. 60515
[22] Filed: May 14, 1973
[21] Appl. No.: 360,154

[52] U.S. Cl. ............................................. 33/178 B
[51] Int. Cl. ....................... G01b 3/34, A63b 47/00
[58] Field of Search ............ 33/178 B, 174 F, 174 Q

[56] References Cited
UNITED STATES PATENTS
3,310,879  3/1967  Brezezinski ...................... 33/178 B
3,512,262  5/1970  Smyk ................................. 33/178 B Primary Examiner—Louis R. Prince
Assistant Examiner—Willis Little
Attorney, Agent, or Firm—Johnston, Keil, Thompson & Shurtleff

[57] ABSTRACT

A gauge adapted to check the sphericity of golf balls which embodies a plate member having thereon a circular hole of a diameter slightly greater than the standarized diameter of a golf ball. About half of the wall of the circular hole is transversely concave to form a concave ball seat. The other half of the hole includes a symmetrically tapered portion providing a relatively sharp edged arc directly opposite the concave seat and preferably has closely spaced line markings on the tapered portion. The golf ball is placed in the hole on the concave seat and rotated about various axes thereof to check its sphericity by noting the constancy or variance in distance between the face of the ball and the sharp edge arc.

4 Claims, 3 Drawing Figures

PATENTED AUG 13 1974 3,828,442

GOLF BALL SPHERICITY GAUGE

The invention herein concerns improvements in sphericity gauges for checking the sphericity of golf balls. A truly spherical golf ball is important for both putting purposes and also for accuracy and trueness of flight of the struck golf ball. The sphericity gauge of the instant invention may be used to check the trueness of sphericity of new golf balls or golf balls which have been previously played. Slicing or topping of the golf ball can cause fractures or indentations of the outer casing which lead to major or minor separations between the casing and the inner core of the ball. Minor fractures or indentations can go unnoticed from casual observation of the ball and yet provide a slight separation of the casing and core which will alter the spherical nature of the ball. It is generally known that an out-of-round golf ball will vary in trajectory from that of a spherical golf ball when each is hit in the same manner. Also, putting accuracy is affected by an out-of-round golf ball.

Sphericity gauges for golf balls in general are known. In Brzezinski et al. U.S. Pat. No. 3,310,879 the sphericity gauge is a ring having an interior cylindrical surface with a diameter equal to or slightly greater than the standard diameter of a golf ball. Sphericity of the golf ball is checked by determining whether or not the golf ball will enter and pass through the cylindrical opening. A similar approach is used in a ring-bearing member mounted on a compression tester described in Hoag U.S. Pat. No. 3,665,757. Another sphericity gauge having an adjunct use as a putting device is disclosed in Smyk et al. U.S. Pat. No. 3,512,262.

THE INVENTION HEREIN

Briefly, the subject invention relates to improvements in sphericity gauges particularly adapted for checking the sphericity or concentricity of golf balls. The gauge is a small, light-weight, plate-like member which can be carried in the pocket or the golf bag. This plate-like member may have any external shape. The diamond or rectangular external shape herein disclosed is a convenient external shape but is not of critical importance to the invention.

The plate-like member has provided therein a circular hole of a diameter which is slightly greater than the standardized diameter of a golf ball. A portion of the wall of the circular hole, preferably about one-half thereof, is transversely concave to form a seat for a golf ball placed in the hole of the gauge. The transverse concavity preferably has a radius which is approximately equal to the radius of the golf ball.

Another portion of the hole is defined by a symmetrically tapered portion providing a relatively sharp edged arc directly opposite the concave seat. The wall portions of the gauge forming at least one side of the taper preferably have closely spaced marking means, e.g., grooves or ridges at spacings of 0.005inch, to aid the golfer in determining the degree of out-of-roundness of the golf ball.

The sphericity gauge is used by holding it vertically with one hand and rotating a golf ball about the various axes thereof with the other hand with the golf ball positioned on the concave seat. If the ball binds as it is rotated about its various axes, this indicates a lack of sufficient sphericity for further use of the golf ball other than for practice purposes.

If the ball turns freely in the hole, the trueness of its sphericity can be further checked by visual observation. The ball and gauge are placed between the eye of the viewer and a light source or light surface. As the ball is rotated on the concave seat, the golfer may sight through the hole at the sharp edged portion thereof directly opposite the concave seat to compare the circumferential edge of the golf ball against the sharp edge of the hole and/or the line markings on the tapered surface. This will enable the golfer to determine whether there are any variations in distance between the sharp edge and the circumference of the golf ball as the latter is rotated about its various axes.

DESCRIPTION OF THE DRAWINGS

A preferred embodiment of the invention is illustrated in the drawings, wherein.

DESCRIPTION OF THE PREFERRED EMBODIMENT

Figure 2:
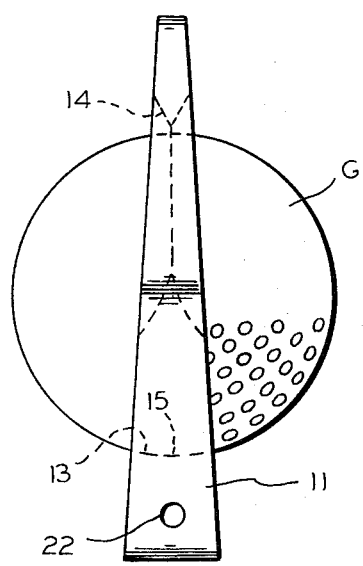
FIG. 2 is a side elevation of the embodiment as viewed from section plane 2—2 of FIG. 1.
Figure 3:
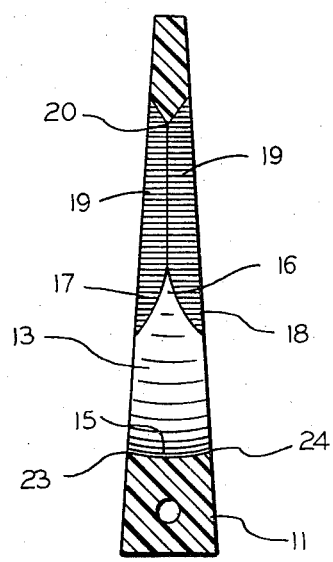
FIG. 3 is a section view taken on section plane 3—3 of FIG. 1 of the gauge per se.

Referring to the drawings, the ball sphericity gauge 10 comprises a plate-like member 11 having a rectangular or diamond external configuration. The exterior shape is of no critical importance. As can be seen in FIGS. 2 and 3, the plate-like member may be tapered from bottom to top. This member may be made in any suitable manner and from any suitable material, such as a molding or casting of a thermoplastic, synthetic polymer. The plate-like member 11 has therein a substantially circular hole 12, the walls of which include a transversely concave segment 13 and, diametrically opposite the concave wall 13, a symmetrically tapered wall portion 14 forming a substantially sharp edge 20 defining the portion of the hole 12 opposite the concave portion 13.

The transversely concave portion 13 has a radius approximately equal to the radius of a standard size golf ball. The diameter of the hole 12 from the center portion 15 of the transverse concavity to the sharp edge 20 is equal to or slightly greater than the diameter of a golf ball of standard size.

Preferably, the transversely concave portion 13 extends about half of the circumference of the hole 12. As its ends approach the portion forming the sharp edge 20, the concavity tapers at the segment 16 to merge into the symmetrically tapered walls 19 forming the sharp edge 20. The sharp edge 20 preferably extends about half of the circumference of the hole 12 with flaring extensions 17 and 18 of the tapered walls 19 on opposite sides of the tapered segments 16 of the concave portion 13.

If desired, the lower corner of the sphericity gauge may be provided with a transverse hole or passage 22, the latter to be used in attaching the gauge to a keychain, cord loop or other means of attachment.

The golfer views the sphericity of the golf ball by placing it in the hole 12 of the gauge. The ball will enter the gauge so long as the distance from the center of the sharp edge 20 to the edge portions 23 or 24 of the transverse concavity is the same as or greater than the diameter of the golf ball. If the ball will enter and/or pass through the hole 12, it has passed the initial test for adequate sphericity or concentricity.

Figure 1:
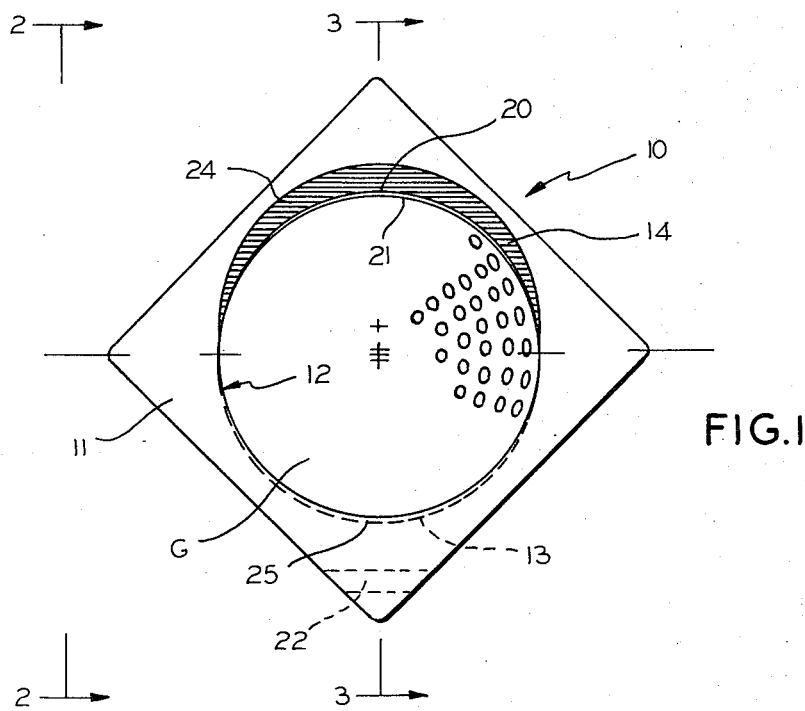
FIG. 1 is a front elevation of the illustrated embodiment with a golf ball mounted in the hole.

Thereafter, with the ball seated in the transverse concavity 13, the golfer holds the gauge 10 in one hand and rotates the golf ball G with the other hand about various axes of rotation thereof. At the same time, he positions the ball and gauge toward a light or a light surface to observe any variations in the spacing 21 between the surface of the golf ball and the sharp edge portion 20 directly opposite the transversely concave seat 13. Such variations in the spacing 21 may be ascertained by the naked eye alone, but preferably are made in conjunction with indicia line markings 24 on at least one of the two taper-forming walls 19. The latter lines may be provided by providing ridges and/or grooves with small spacings therebetween, e.g., 0.05inch. These line markings may extend the full length of the walls 19, although the only important markings are those contiguous to the spacing 21. These line markings preferably extend as shown in FIG. 1 in directions at right angles to the diameter line extending between the middle 25 of the concave seat 13 and the diametrically opposite point of the sharp edge 20.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A gauge adapted to check the sphericity of golf balls comprising a plate member having therein a circular hole of a diameter slightly greater than the standardized diameter of a golf ball, a portion of the wall of said circular hole being transversely concave at a concavity radius approximately equal to the radius of the golf ball and thereby forming a concave seat upon which said golf ball will rest when placed in and rotated in said hole, and the other portion of said hole having a symmetrically tapered portion providing relatively sharp edged arc directly opposite the concave seat; whereby a golf ball may be placed in said hole on said seat and rotated about various axes thereof in said hole to check its sphericity by noting the constancy or variance in distance between the surface of said ball and said sharp edge arc.

2. A gauge as claimed in claim 1, and closely spaced marking means on said tapered portion to estimate by sight the amount of variation in sphericity of a golf ball.

3. A gauge as claimed in claim 1 wherein said tapered portion extends approximately one half of the circumference of said hole.

4. A gauge as claimed in claim 3 wherein the transversely concave portion of said wall extends approximately the other half of the circumference of said hole.

* * * * *